(12) United States Patent
Edwards

(10) Patent No.: US 7,142,985 B2
(45) Date of Patent: Nov. 28, 2006

(54) METHOD AND APPARATUS FOR IMPROVING WIRELINE DEPTH MEASUREMENTS

(75) Inventor: Carl M. Edwards, Katy, TX (US)

(73) Assignee: Baker Hughes Incorporated, Houston, TX (US)

(*) Notice: Subject to any disclaimer, the term of this patent is extended or adjusted under 35 U.S.C. 154(b) by 189 days.

(21) Appl. No.: 10/926,810

(22) Filed: Aug. 26, 2004

(65) Prior Publication Data

US 2006/0047430 A1  Mar. 2, 2006

(51) Int. Cl.
*G00V 1/40* (2006.01)
*G06F 19/00* (2006.01)

(52) U.S. Cl. ............................................ 702/6; 175/45
(58) Field of Classification Search ............... 702/1–16
See application file for complete search history.

(56) References Cited

U.S. PATENT DOCUMENTS

| | | | | |
|---|---|---|---|---|
| 3,490,149 A | * | 1/1970 | Bowers | 340/854.1 |
| 4,545,142 A | * | 10/1985 | Whisnant | 40/605 |
| 4,545,242 A | | 10/1985 | Chan | 73/152 |
| 5,019,978 A | * | 5/1991 | Howard et al. | 702/6 |
| 5,541,587 A | * | 7/1996 | Priest | 340/854.1 |
| 5,678,643 A | * | 10/1997 | Robbins et al. | 175/45 |

* cited by examiner

*Primary Examiner*—John Barlow
*Assistant Examiner*—Victor J. Taylor
(74) *Attorney, Agent, or Firm*—Madan, Mossman & Sriram, P.C.

(57) ABSTRACT

Wireline depths are estimated using cable depth measurements and accelerometer depth measurements made over a time interval encompassing the time for which the wireline depth is being estimated. A least squares smoothing filter or a weighted least squares smoothing filter may be used. Problems caused by washouts in the borehole are also addressed.

34 Claims, 12 Drawing Sheets

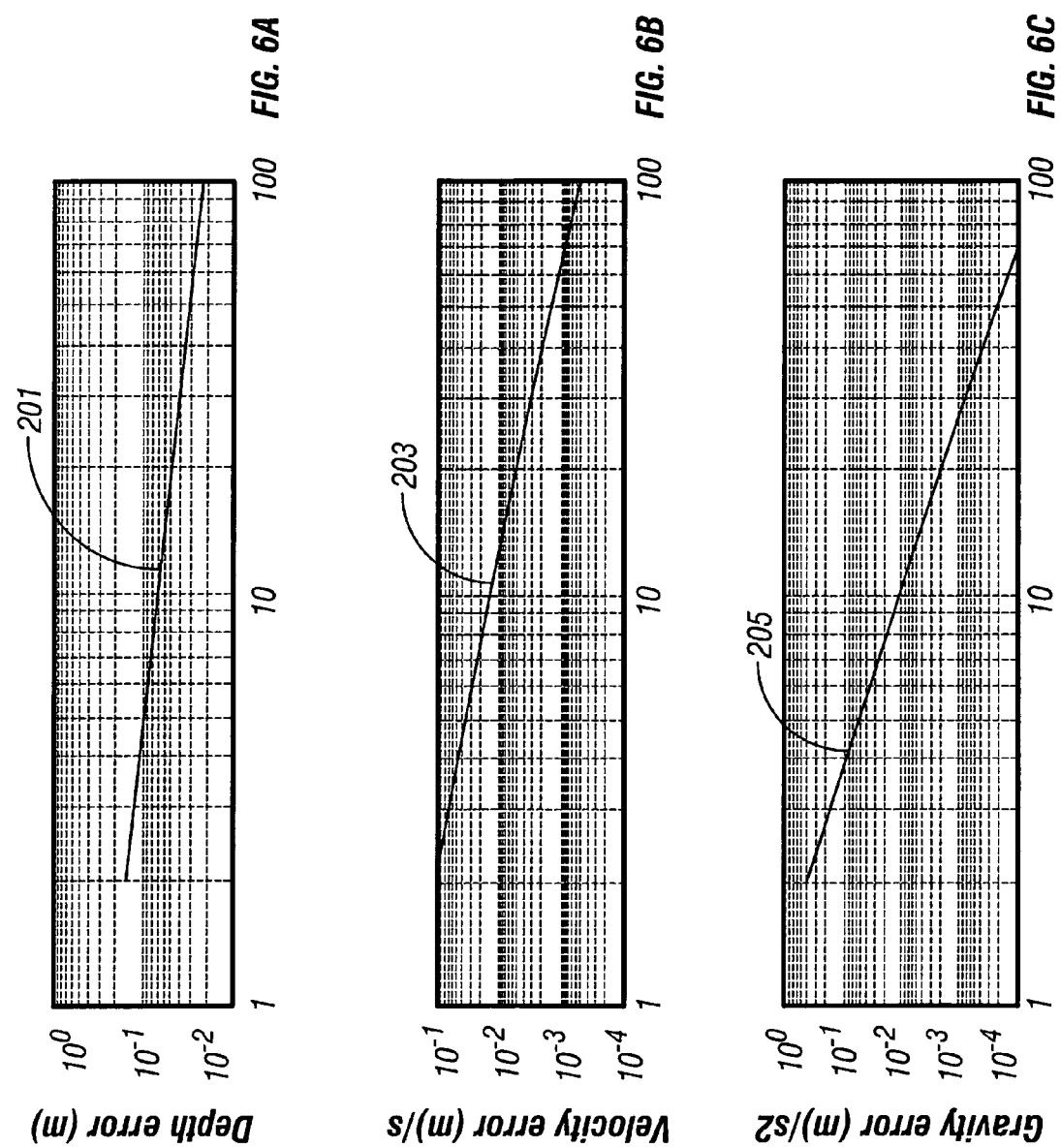

METHOD AND APPARATUS FOR IMPROVING WIRELINE DEPTH MEASUREMENTS

BACKGROUND OF THE INVENTION

1. Field of the Invention

The present invention relates generally to apparatus and methods for determining the "true" depth of a well logging tool suspended from a cable inside a wellbore. This may be done while the cable is being raised or lowered inside a well bore. The method is based on processing of accelerometer measurements.

2. Description of the Related Art

Electric wireline well logging instruments are typically inserted into and withdrawn from wellbores by means of armored electrical cables. The logging instruments generate signals which are related to physical properties of the earth formations through which the wellbore is drilled. A record of the properties of the earth formations with respect to depth in the wellbore is generally made at the earth's surface by pulling the logging instrument out of the wellbore by reeling the cable onto a winch or similar spooling device, while simultaneously recording the signals generated by the logging instrument. The record of the measurements is thus made to correspond to the apparent depth within the wellbore at which the measurements were made by the logging instruments.

Measurement of the apparent depth of the instrument in the wellbore is typically performed with a calibrated wheel placed in frictional contact with the cable at the earth's surface. The calibrated wheel turns correspondingly with the amount of linear motion of the cable as the cable is moved into or out of the wellbore by the winch. The wheel can be rotationally coupled to a mechanical counter calibrated to indicate the length of cable moved past the wheel, or the wheel can be coupled to an electronic encoder connected to a computer or electronic counter to indicate and record the length of cable which has moved past the wheel. It is assumed that the length of cable extended past the wheel directly corresponds to depth of the instrument in the wellbore.

Calibrated wheels can accurately determine the total length of cable which has been spooled past the wheel into the wellbore, but the true depth of the instrument in the wellbore may not correspond exactly to the spooled length of cable because the cable is subject to change in its overall length as the tension on the cable varies. The tension on the cable is affected by things such as the total weight of the cable disposed within the wellbore, which can be as much as 500 pounds (227 kg) for each 1000 feet (305 m) of cable. Tension is also affected by the weight of the instrument when it is inserted into the wellbore, which weight can vary depending on instrument density (related to the weight of the instrument and how much of the instrument volume is enclosed air space) and the density of a fluid ("drilling mud" or "completion fluid") which may fill the wellbore, and can also be affected by friction caused by movement of the instrument against the wall of the wellbore.

Friction is the least predictable of the causes of tension on the cable as it is moved into and out of the wellbore because the wall surface of the wellbore has an indeterminate degree of roughness and the earth formations penetrated by the wellbore have indeterminate frictional coefficients. The fluid which typically fills the wellbore can have indeterminate viscosity and lubricating properties at different depths within a particular wellbore, making determination of friction even more difficult.

It is frequently the case that the measurements made by the instrument are made at depths as much as ten feet or more different from the depth indicated by the calibrated wheel because of tension induced stretch in the cable. Various methods have been developed to correct the apparent depth measurements for changes in the stretch of the cable as caused by the previously described factors. U.S. Pat. No. 3,490,149 issued to Bowers, for example, describes using measurements made by accelerometers disposed in the logging instrument to calculate a change in axial position of the logging instrument, so that the cable length measurements made at the earth's surface can be corrected by using the calculated change in instrument position. U.S. Pat. No. 4,545,242 issued to Chan describes a more sophisticated method for using accelerometer measurements to determine a "correct" instrument position. Kalman filtering is used for the purpose. The function of the Kalman filter is changed when stick and pull is detected. During that interval less emphasis is placed on the uphole measurement than the downhole measurement.

U.S. Pat. No. 5,541,587 issued to Priest describes a method for determining correct depth of a well logging instrument using a combination of accelerometer measurements and a measurement of phase shift in an electrical signal passed through the logging cable, where the phase shift corresponds directly to the overall length of the logging cable. The phase shift measurement thus corresponds to the amount of stretch in the cable, this measurement being used to calculate instrument position where the accelerometer measurements are least effective and most erroneous, namely when the acceleration on the instrument is zero. U.S. Pat. No. 5,019,978 to Howard et al. discloses another method of depth determination in which Kalman filtering is used for depth determination. The software includes a parameter estimation routine for estimating the resonant frequency and the damping constant associated with the cable at different depths of the tool in the borehole.

The Kalman filter (or smoother) assumes that the noise in the measurements of acceleration and surface depth are assumed to zero mean and Gaussian. The method also assumes that the measurement noise is well characterized in terms of amplitude and correlation with the noise of other measurements. There is a need for a method of determination of tool depth in a borehole that makes a minimum of assumptions. The present invention satisfies this need.

SUMMARY OF THE INVENTION

The present invention is a method of determining the depth of an instrument conveyed in a borehole, such as on a wireline. Surface measurements indicative of the depth of the instrument are made along with accelerometer measurements of at least the axial component of instrument motion. For a specified time, data from a time interval that encompasses the specified time are processed using a smoothing operation and the depth of the instrument is estimated. For a wireline conveyed instrument, conventional cable depth measurements may be used as the surface measurements. In one embodiment of the invention, the time interval is symmetric about the specified time, though this is not a limitation of the invention. In one embodiment of the invention, the time window is selected so that an inclination of the borehole over the depth interval transited by the instrument is constant, though this is not a limitation of the invention. With some modification of the assumption of constant inclination, the method can also be used in boreholes with severe washouts. The sampling interval for the accelerometer measurements is selected to satisfy certain criteria, including the Nyquist criterion. The time interval may be determined based on the logging speed, the inclination of the borehole, and the build rate of the borehole.

Processing involves a double integration of the accelerometer measurements. Differences between the integrated accelerometer measurements and the wireline depth measurements are minimized in the smoothing process. The least squares minimization procedure involves the use of a matrix determined by the time interval: this matrix may be pre-computed so that depth determination is made substantially in real time. A suitable weighting may be part of the matrix specification. Along with depth and velocity estimates, estimates are also made of errors in the estimates, and of the inertial component of acceleration measurements.

The processing may be done by a surface processor, a downhole processor or by a processor at a remote location. A memory device associated with the processor is used for storing the measurements so that the processor has access to the past and future measurements needed for the smoothing operation. The processor may also select the time interval and the time sampling interval for the accelerometer measurements.

BRIEF DESCRIPTION OF THE DRAWINGS

The present invention is best understood with reference to the accompanying figures in which like numerals refer to like elements and in which:

FIGS. 6a, 6b and 6c show the depth error, velocity error and gravity error as a function of window length for an instrument depth of 1500 m;

DETAILED DESCRIPTION OF THE INVENTION

Figure 1:
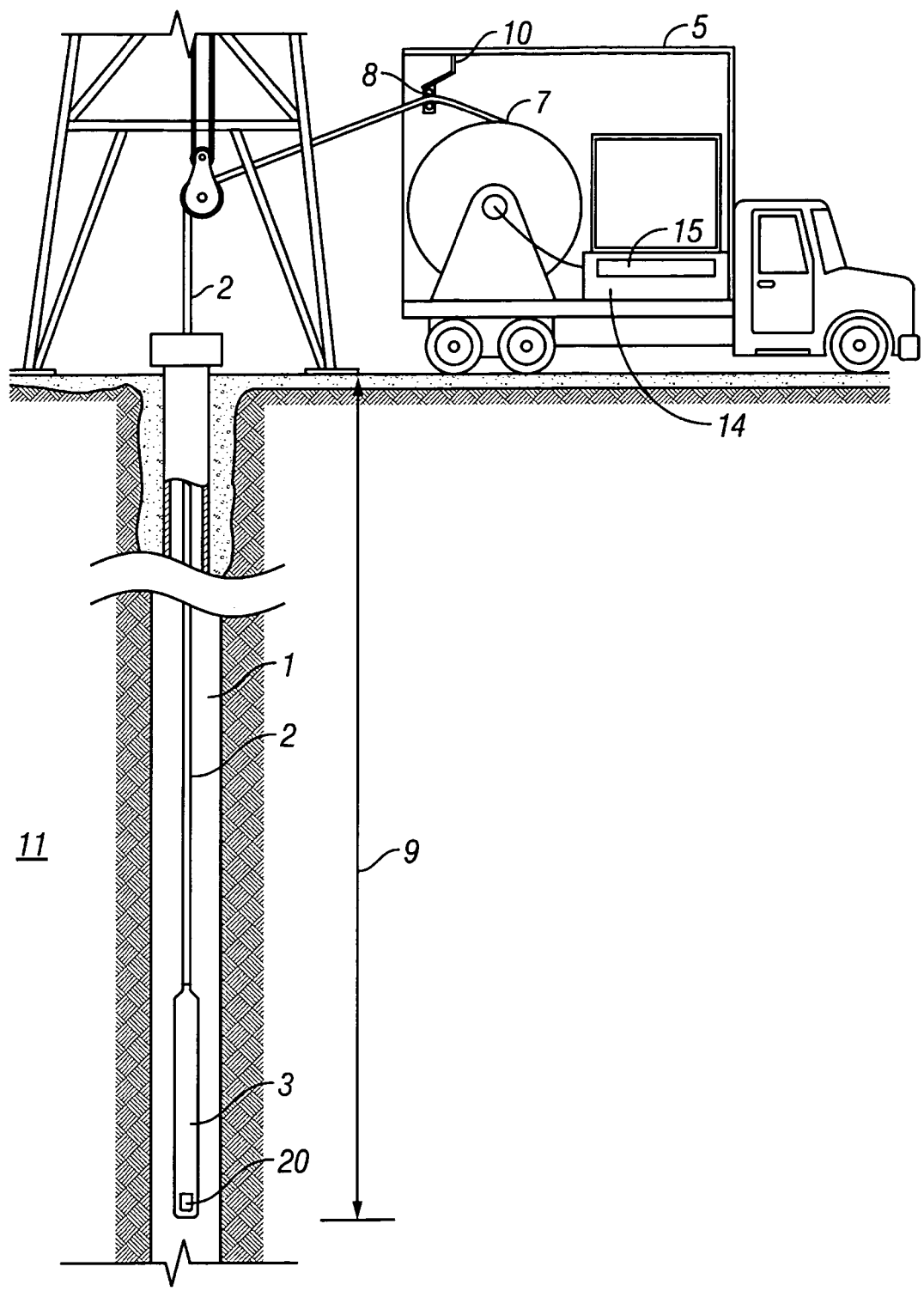
FIG. 1 (prior art) shows a well logging instrument lowered into a wellbore and a prior art systems for measuring the depth of the instrument in the wellbore.

FIG. 1 shows a well logging instrument 3 as it is typically disposed in a wellbore 1 for recording a well log. The instrument 3 is attached to one end of an armored electrical logging cable 2. The cable 2 is extended into and withdrawn from the wellbore 1 using a winch 7 forming part of a surface logging unit 5. As the cable 2 is unspooled from the winch 7, it passes through a measuring head 8 suspended from a spooling arm 10 attached to the logging unit 5. The measuring head 8 can include an encoder (not shown) for measuring the length of cable 2 unspooled from the drum 7 as it passes the measuring head 8. A well log is typically conducted by first unspooling the cable 2 into the wellbore 1 and then respooling the cable 2 onto the drum 7 while causing the instrument 3 to make measurements corresponding to various properties of formations 11 penetrated by the wellbore 1 as the instrument is correspondingly pulled out of the wellbore 1. The encoder (not shown) on the measuring head 8 is electrically connected to a processor 14 which can include a depth display (not shown). The length of cable 2 spooled into the wellbore 1 as measured by the measuring head 8 typically corresponds directly to the depth 9 of the instrument 3 in the wellbore 1, unless friction between the instrument 3 and the wellbore 1, or the weight of the instrument 3 and the cable 2 causes the cable 2 to stretch an indeterminate amount as the cable 2 is spooled back onto the winch 7. As the cable 2 is spooled onto the winch 7, the encoder (not shown) on the measuring head 8 instructs the computer 14, as selected incremental lengths of the cable 2 are moved past the measuring head 8, to generate an output record of the signals sent by the instrument 3 along the cable 2. The size of the selected incremental length will depend on the type of sensor (not shown separately) in the logging instrument 3, but will typically be of the order of 0.125 foot (0.0381 m) for most types of well logging instruments. A satellite link may be provided for transmission of the data to a remote location. Included in the surface processor are conventional electronics such as a A/D converter 15 and a memory. Optionally, a downhole processor (not shown) that includes an A/D converter and a memory may be provided on the downhole instrument.

Still referring to FIG. 1, the logging instrument 3 also includes an accelerometer 20 which has a sensitive axis generally parallel to the axis of the logging instrument 3. The accelerometer 20 measures the acceleration of the instrument along the axis of the instrument 3 which is generally along the direction of motion of the instrument along the wellbore 1. The accelerometer 20 measurements are processed according to the method of the present invention using the downhole processor, the surface processor or a processor at the remote location.

Figure 2:
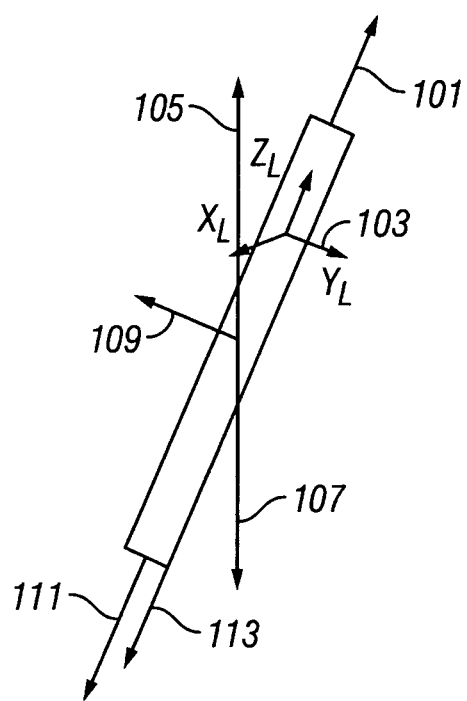
FIG. 2 shows the forces diagram of a typical downhole tool.

Turning now to FIG. 2, the force diagram on a typical downhole tool is shown. The cable tension 101 acts along the borehole axis on the tool. The local coordinate system for the accelerometer 103 is as shown. The buoyancy force is denoted by 105 and the gravity force by 107. The normal borehole force is denoted by 109 while 111 and 113 depict the hydrodynamic drag and frictional forces as the tool is moved up the borehole.

The tool follows a path L(s) with s the depth along the borehole. The global z-axis is parallel to the gravitational force. The global x- and y-axes form a right-handed coordinate system. The coordinate s satisfies the expression, $$ds = \sqrt{dx^2 + dy^2 + dz^2} \qquad (1).$$

The cable speed is given by $$V = \left|\frac{ds}{dt}\right| = \sqrt{\frac{dx^2}{dt^2} + \frac{dy^2}{dt^2} + \frac{dz^2}{dt^2}}. \quad (2)$$

The velocity in the fixed frame is $$\begin{aligned}\vec{v} &= \frac{d\vec{L}}{dt} \\ &= \left(\frac{dx}{dt}, \frac{dy}{dt}, \frac{dz}{dt}\right) \\ &= \left(\frac{dx}{ds}, \frac{dy}{ds}, \frac{dz}{ds}\right)\frac{ds}{dt} \\ &= V\vec{l}\end{aligned} \quad (3)$$

where $\vec{1}$ is the vector tangent to the borehole and s is the coordinate along the axis of the borehole and is parallel to the local z-axis of the tool, $z_L$, when the tool is at the depth s. It is easily shown that $|l|=1$.

Figure 3:
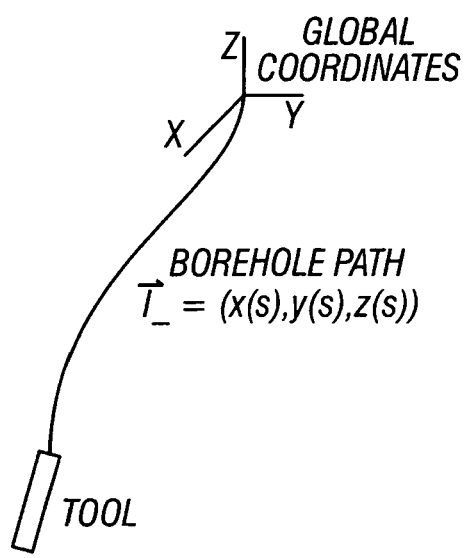
FIG. 3 shows the trajectory of the tool in the borehole.

Referring now to FIG. 3, The forces along the local z-axis of the tool is given by $$F(t) = T(t) - f(t) - F_d(t) - m\vec{g} \cdot \hat{z}(t) \quad (4)$$

where T is the tension in the cable, f is the friction, $F_D$ is the hydrodynamic drag. We are concerned with the first three terms in eqn. (4) but not the gravity term. The gravity term creates slowly varying error term that must be removed. Let us assume that we can accomplish this feat. Then the acceleration along the borehole is given by $$a(t) = F(t)/m = (T(t) - f(t) - F_D(t))/m \quad (5).$$

where m is the mass of the tool. Integrating this twice with respect to time, starting at an arbitrary time $t_0$, we find $$s(t) = s_0 + v(t - t_0) + \int_{t_0}^{t} dt' \int_{t_0}^{t'} dt'' a(t''), \quad (6)$$

where $s_0$ is the location of the tool and $v_0$ is its instantaneous velocity at time $t_0$. In order to use this equation, we need to determine $z_0$, $v_0$ and $t_0$. The initial time is arbitrary, so without loss of generality we can set $t_0=0$. We are now left with the two constants of integration.

$$s(t) = s_0 + v_0 t + \int_0^t \int_0^{t'} dt'' a(t''). \quad (7)$$

These constants can be determined in a number of different ways. There are several methods described in the literature. The most straightforward is determining the initial position and velocity and performing the double integration. In one method, it is assumed that the cable speed and depth are accurate measures of the initial velocity and position when calculating borehole depths from accelerometer data.

Another method would be determining the initial position and final position over some time interval. This method essentially uses the initial position as one constant and computes the other from the average velocity or displacement over that time interval.

Care should be taken when using double integration to find the position of the tool. The error in the double integral is proportional to $t^{3/2}$. Unless the time (or depth) interval is sufficiently short, the depth estimate becomes meaningless. Thus, at various repeated intervals, one must tie the accelerometer based estimates to the surface wireline measurements. A final problem is identifying and removing the effect of gravity. This will be discussed later in the document. There are some possible methods. An average value of acceleration could be calculated over some sufficiently long interval and subtracted from the data. The gravitational component could also be computed from first principles.

The acceleration caused by gravity must be subtracted from the accelerometer data in order for the accelerometer depth correction to work. Two methods can be used. In one method, the acceleration due to gravity is predetermined using an accurate gravity survey. For the gravity survey method to work, the surveyed value must be corrected for depth. Optionally, corrections are also made for anomalies in the density of the earth's crust, if these are sufficiently large. We already know that it is possible for sensitive borehole gravity surveys to measure oil in-place far from the borehole. The procedure for correcting the gravity survey is to first depth correct the gravity survey. The x- and y-components of the acceleration (as measured by suitable accelerometers) are averaged over a sufficient interval to calculate $g_\perp$, the component of gravity perpendicular to the borehole. Next, $g_\parallel$, the component of gravity parallel to the borehole is estimated from the depth-corrected gravity survey and $g_\perp$. Next, $g_\parallel$ is subtracted from z-axis acceleration.

In an alternate embodiment of the invention, the acceleration due to gravity is determined from the accelerometer measurements directly. In it we estimate $g_\parallel$ by averaging the z-axis accelerometer data over a sufficiently large period and subtract this value from the instantaneous z-axis acceleration.

$$g_{//} = \frac{1}{2M+1} \sum_{m=-M}^{M} a_{z,m}$$

The statistical error in the computation of g// will be given by the rms deviation of the acceleration measurements themselves. In sections of the well where there are large accelerations caused by stick and pull, the error in the gravitation estimate will be large. These are also the sections where the depth corrections will be large. In smooth sections, the gravitational component will be more accurate, but the depth corrections will be small.

Figure 4:
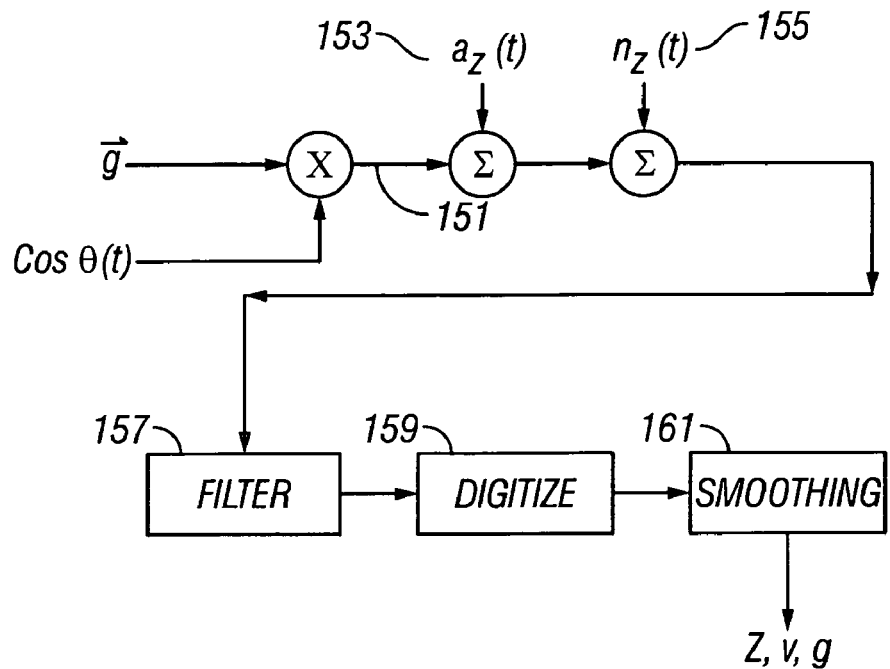
FIG. 4 shows various quantities of interest during the processing flow of the present invention.

The processing flow for estimating depth from the accelerometer data is shown in FIG. 4. The component of gravity along the tool axis g cos θ(t) 151 is added to the acceleration of the tool $a_z(t)$ 153 along with noise $n_z(t)$ 155. The resultant signal is filtered 157 and digitized 159. The digitized signals are then smoothed 161 as discussed further below to provide an estimate of tool position, velocity and gravity component along the tool axis. Before we discus the processing, we digress briefly to discuss the concept of smoothing.

Figure 5:
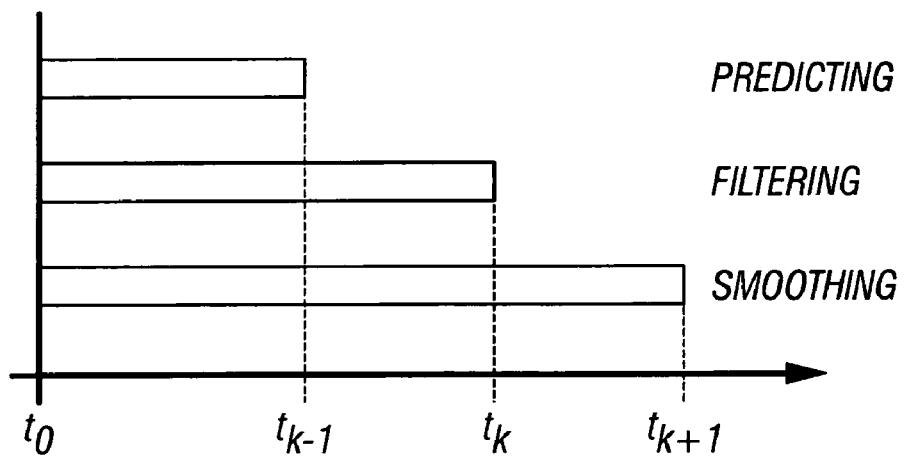
FIG. 5 illustrates the concept of prediction, filtering and smoothing.

The three concepts of prediction, filtering and smoothing are closely related and are best illustrated through an example shown in FIG. 5. The example corresponds to a moving vehicle for which the parameters of interest are its instantaneous position at some time $t_k$. The process of computing the vehicle's position in real-time (that is, observations are taken up to and including time $t_k$, position required at $t_k$) will be referred to as filtering. The computation of the expected position of the vehicle at some subsequent time $t_k$, based on an earlier measurement made up to and including time $t_{k-1}$ is properly termed prediction, while the estimation of where the vehicle was (say at time $t_k$), using measurement made at at least one subsequence time $t_{k+1}$ is referred to as smoothing. In terms of this model, the prior art methods such as those of Chan and of Howard et al use Kalman filtering to get an estimate of the tool position (and velocity) based on measurements previously made, and including a measurement made at the present instant. A point of novelty of the present estimate is the use of "future" measurements to improve the estimate over that resulting from a filtering operation. Such smoothing can be obtained in a rigorous manner, as a logical extension of the filtering methods. As the parameters at different epochs are related through a kinematic model, the filtered estimate is no longer optimal as soon as later measurements become available. A new estimate that includes the contributions of the later measurements can be computed. Improving previous estimates via a new measurement is therefore smoothing and, as in the case of filtering, is referred to as "optimal smoothing" if optimal estimation methods are employed. Although the three procedures are separate, and can be applied independently, they may also be applied sequentially.

In the least-square approach of the present invention, the determination of the gravitational component and the two time constants in eqn (7) are done simultaneously. The estimate of z(t) is compared to the surface-depth measurement over a time interval and the constants are adjusted to minimize the error over that interval. Thus, the integration constants are tool speed and depth at some instant of time in the time interval. The least-square approach seeks to minimize the error term as shown in the following expression:

$$\sigma^2(t_i) = \sum_{m=-M}^{M} \left( z_{0,i} + v_{0,i}(t_i - t_{i+m})^2 + \frac{1}{2}g_{z,i}(t_i - t_{i+m}) + z_{wl,i+m} - z_{a,i+m} \right)^2 \quad (8)$$

where $$z_{a,i} = \int_{t_i}^{t_{i+m}} dt' \int_{t_1}^{t'} dt'' a(t'') \quad (9)$$

where $z_0$ and $v_0$ are the integration constants, $z_{wl}$ is the wireline depth measurement. Eqn. (8) is given as a symmetric time window of length 2M, (i.e., the time $t_i$ is substantially in the middle of the window) but asymmetric windows could also be used. Implicit in the minimization procedure is an assumption that the gravity component does not change within the time window Before we discuss the implementation of the smoothing operation, two factors must be considered. To use accelerometer data we need to assure ourselves that both the analog and digital data are processed properly. For example, a necessary step in the data processing stream is to apply an analog filter to the data prior to digitization. When the data are digitized with a dwell time $\tau$, for a time T, one representation of eqn. (7) is $$z(n\tau) \simeq z_0 + n\tau v_0 + \sum_{i=0}^{n-1}\sum_{j=0}^{i-1} a(j\tau). \quad (10)$$

The Nyquist frequency is $$f_N = \frac{1}{2\tau} \quad (11)$$

and accelerations with a characteristic frequency $f > f_N$, will be aliased to lower frequency. Furthermore, any acceleration with a characteristic frequency $f < 1/T$ will be treated as constant and lumped in with the effect of gravity. This last effect is especially troublesome because errors in the gravity estimate will propagate as $t^2$. We need to make sure that the output of the accelerometer passes through a low-pass filter and that we don't subtract out low frequency components along with gravitational acceleration. To estimate the dwell time and low-pass filter cutoff frequency, we assume that the acceleration in eqn. (7) is a cosine function. Then the change in position, $\delta z(\omega)$ due to acceleration at that frequency is $$\delta z(\omega) = -\frac{a(\omega)}{\omega^2}(\cos\omega t - 1). \quad (12)$$

If $\delta z(\omega) < \delta z_{max}$ and then the Nyquist frequency must satisfy, $$\delta z_{max} > \frac{a_{max}}{(2\pi f_N)^2} \quad (13)$$

or $$f_N > \frac{1}{2}\sqrt{\frac{a_{max}}{\delta z_{max}}}. \quad (14)$$

The dwell time is then $$\tau < \pi\sqrt{\frac{\delta z_{max}}{a_{max}}}. \quad (15)$$

Thus, in order to have an error of less than 1 cm in depth estimation, and for a value of $\alpha_{max}$ of 3 g, then $f_N = 8.6$ Hz and $\tau = 58$ ms.

Another factor to consider is the length of the window over which smoothing is done. The measured acceleration may change slowly over time for a variety of reasons. Among these are: changes in accelerometer properties with temperature or time and a change in orientation of the tool. Changes in wellbore deviation relative to vertical will vary the amount of gravitational acceleration that is in the direction of tool motion and therefore create error in the measurement. For example, we assume that the velocity along the borehole is $v_L$, the radius of curvature of the well is R and that the local plane of the well is parallel to the gravitational vector. This corresponds to a maximum rate of change in the orientation of the tool. The rate of change of the inclination is $$\dot{\theta} = \frac{v_L}{R}. \tag{16}$$

This gives a rate of change in the gravitational vector along the local z-axis as:

$$|\dot{g}_\perp| = \frac{d}{dt}\vec{g}\cdot\hat{z}_L = g\frac{d}{dt}\cos\theta = (g\sin\theta)\dot{\theta} = \frac{gv_L}{R}\sin\theta. \tag{17}$$

The fractional change in a time T is bounded by the expression:

$$\frac{\delta g_\perp}{g} < \frac{v_L}{R}T. \tag{18}$$

For a typical value of R=100 ft. (30.48 m) and $v_L$=60 ft/min (18.3 m/s), than dg/g is about 1% per second and cannot be ignored.

In Table 1 the maximum processing window times are shown as a function of build rate and deviation from vertical. One can see that for a horizontal well the times are quite. For the vertical well the maximum build rate would be between 6 and 24° per 100 ft. Table 1 gives a set of values to be used for guidance.

| Build rate | Deviation from vertical (degrees) | | | | | | |
|---|---|---|---|---|---|---|---|
| (°/100 ft) | 0 | 15 | 30 | 45 | 60 | 75 | 89 |
| 6 | 47 | 48 | 50 | 56 | 66 | 92 | 354 |
| 24 | 12 | 12 | 13 | 14 | 17 | 23 | 89 |
| 40 | 7 | 7 | 8 | 8 | 10 | 14 | 53 |
| 56 | 5 | 5 | 5 | 6 | 7 | 10 | 38 |
| 72 | 4 | 4 | 4 | 5 | 6 | 8 | 30 |
| 111 | 3 | 3 | 3 | 3 | 4 | 5 | 19 |
| 150 | 2 | 2 | 2 | 2 | 3 | 4 | 14 |

Returning now to FIG. 4, we discuss the smoothing operation further. We can rewrite eqn. (8) by combining the surface-depth measurement and the double integral of the acceleration measurements into a single term and at the same time considering only a single window of data and without loss of generalization set $t_i$ to zero.

$$\sigma^2 = \sum_{m=-M}^{M}\left(z_0 + v_0 t_m + \frac{1}{2}g_z t_m^2 - \delta z_m\right)^2 \tag{19}$$

where have used $$z_{a,m} = \int_0^{t_m} dt' \int_0^{t'} dt'' a(t'') \tag{20}$$

and $$\delta z_m = z_{a,m} - z_{wl,m} \tag{21}$$

is the difference between the integrated accelerometer measurements and a wireline depth measurement. The term within the parentheses of eqn. (19) can be written in matrix form as:

$$Qx - \delta z \tag{22}$$

$$\text{with } Q = \begin{bmatrix} 1 & t_{-M} & \frac{1}{2}t_{-M}^2 \\ 1 & t_{-M+1} & \frac{1}{2}t_{-M+1}^2 \\ \vdots & \vdots & \vdots \\ \vdots & \vdots & \vdots \\ 1 & t_M & \frac{1}{2}t_M^2 \end{bmatrix}$$

$$\delta z = \begin{bmatrix} \delta z_{-M} \\ \delta z_{-M+1} \\ \vdots \\ \delta z_M \end{bmatrix}$$

$$x = \begin{bmatrix} z_0 \\ v_0 \\ g_z \end{bmatrix} \tag{23}$$

Eqn. (19) becomes $$\sigma^2 = (Qx - \delta z)^T(Qx - \delta z) \tag{24}$$
$$= (x^T Q^T - \delta z^T)(Qx - \delta z)x^T Q^T Qx - x^T Q^T \delta z -$$
$$\delta z^T Qx + \delta z^T \delta z$$

where $^T$ denotes the transpose of a matrix.

Taking the partial derivative of eqn. (24) with respect to x and setting it equal to zero gives the result $$x = (Q^T Q)^{-1} Q^T \delta z \tag{25}.$$

In one embodiment of the invention, the time interval between the surface depth measurements is kept constant. The matrix $(Q^T Q)^{-1} Q^T$ is computed ahead of time and stored. The precomputed matrix can then be used for a repeated application of the least-square technique to successive windows of data. $Q^T Q$ is non-singular and has an inverse. In an alternate embodiment of the invention, the time intervals are not evenly spaced and constant for each depth estimate, and the minimization problem can be used by one of several prior art techniques including singular value decomposition (SVD).

We next discuss the propagation of errors in the method of the invention. The error propagation is governed by the relation $$\sigma_z^2 = \sum_i \left(\frac{dz}{dx_i}\right)^2 \sigma_{x_i}^2. \quad (26)$$

Examining eqn. (25), the sources of error are confined to the $\delta z$ term if the measurement times are sufficiently accurate. The error terms can be further decomposed by separating the $\delta z$ term into its components: the surface-depth measurement and the double integral of the acceleration. Changing eqn (25) into a sum we find that $$\frac{dx_i}{d(\delta z_j)} = ((Q^T Q)^{-1} Q^T)_{ij}$$

and $$\sigma_{x_i}^2 = \sum_j ((Q^T Q)^{-1} Q^T)_{ij}^2 \sigma_{\delta z_j}^2.$$

The new matrix is this expression can be precomputed and stored along with the initial matrix. This expression can be used to compute the propagation of instrument errors and statistical errors.

For statistical errors we substitute the actual least-square error sum for the error of the individual terms.

$$\sigma_{\delta z_j}^2 = \frac{\sigma^2}{2M + 1 - 3}. \quad (27)$$

This gives $$\sigma_{x_i}^2 = \frac{\sigma^2 \sum_j ((Q^T Q)^{-1} Q^T)_{ij}}{2M - 2}. \quad (28)$$

The depth error corresponds to i=1 in eqn (28), the velocity error corresponds to i=2 in eqn. (28) and the error in the gravitational component corresponds to i=3 in eqn. (28).

Other sources of error are errors in the wireline depth measurements and errors in the accelerometers. This can be represented as $$\sigma_{x_i}^2 = \sum_j ((Q^T Q)^{-1} Q^T)(\sigma_{z_{wl,j}}^2 + \sigma_{z_{z,j}}^2) \quad (29)$$

The surface-depth measurement error is proportional to the depth. When using an encoding wheel assembly, the error is 1 part per thousand. When magnetic marks and a sophisticated line stretch algorithm are used the error reduces to 1 part in $10^4$ (Kerr Measurements Systems 2002). However over the data window it can be considered a constant. Thus, we are left with determining the error caused by the acceleration measurements. There are several methods for computing the double integral. They all should lead to approximately the same result. The double integral reduces to a double sum $$z_{a,m} = \int_0^{t_m} dt' \int_0^{t'} dt'' a(t'') \approx \tau^2 \sum_{i=0}^{n-1} \sum_{j=0}^{i} a_j \quad (30)$$

where $\tau_m/\tau = n$.

The double summation of eqn (30) can be written as a single sum $$\sum_{i=0}^{n-1} \sum_{j=0}^{i} a_j = \sum_{i=0}^{n-1} (n-i) a_i. \quad (31)$$

This gives:

$$\sum_{j=0}^{n-1} \left(\frac{dz_{a,m}}{da_j}\right)^2 = \sum_{j=0}^{n-1} \left(\sum_{i=0}^{n-1} \tau^2 (n-1)\delta_{ji}\right)^2 \quad (32)$$

$$= \tau^4 \sum_{j=0}^{n-1} (n-j)^2$$

$$= \frac{n\tau^4}{6}(n+1)(2n+1) \cong \frac{n^3 \tau^4}{3}$$

$$= \frac{\tau |t_m^3|}{3}$$

for n>15.

Combining this with eqn (29), we get:

$$\sigma_{x_i}^2 = \sum_j ((Q^T Q)^{-1} Q^T)_{ij}^2 \left(\sigma_{x_{wl,j}}^2 + \frac{1}{3}\tau |t_j^3| \sigma_a^2\right). \quad (33)$$

FIGS. 6a–6c shows the total instrument error assuming a depth of 1500 m. FIG. 6a shows the error in depth estimate 201, FIG. 6b displays the error in the velocity estimate 203 and FIG. 6c illustrates the error in the gravitational component estimate 205. The abscissa is the window length in seconds. An important point to note is that errors are decreasing as the square-root window length. This implies that the accelerometer corrected depth estimate is dominated by the wireline error. So the accelerometer corrected total depth is only better because we are using more surface-depth estimates. However, errors in the surface-depth estimates must be highly correlated and we are concerned with errors in the relative depth over distances of perhaps 100 m. We should therefore use an error of 1/10000 of this distance rather than the total depth. This might be like moving the tool 100 m, moving it back and the tool would not be at exactly the same depth according to some log such as a gamma ray.

Figure 7A:
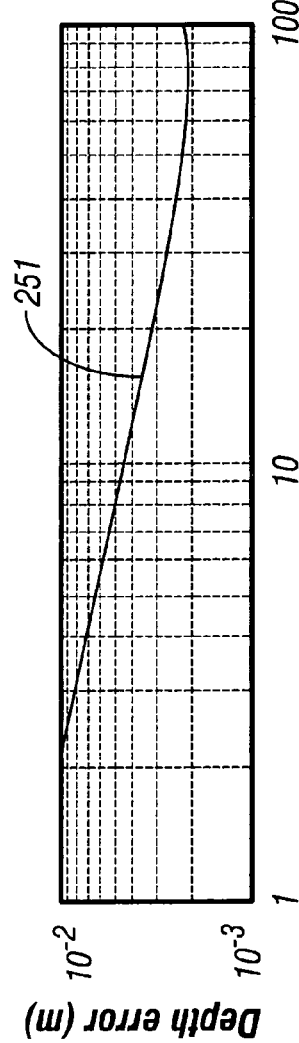
FIGS. 7a, 7b and 7c show the depth error, velocity error and gravity error as a function of window length for a relative surface depth error or 1 cm.
Figure 7B:
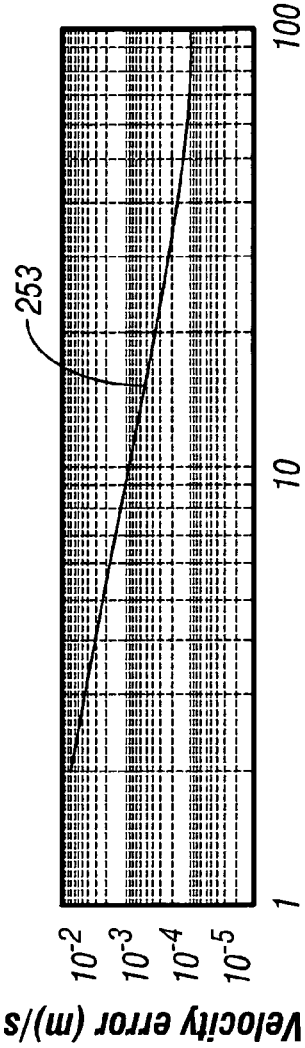
Figure 7C:
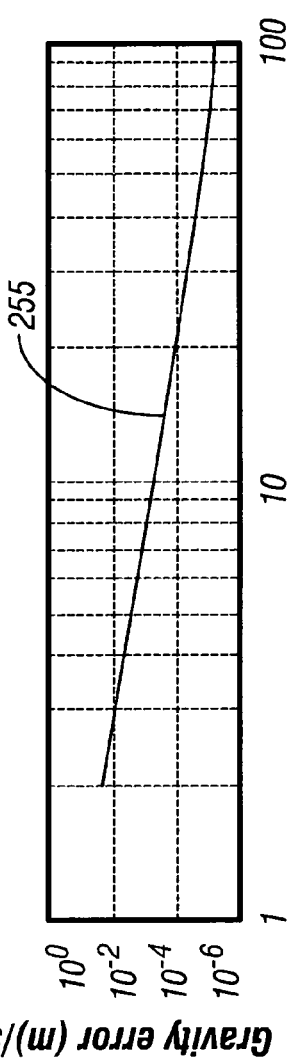

FIGS. 7a–7c show the estimate of total instrument error with a relative surface-depth error of 1 cm. The depth error is shown by 251 in FIG. 7a, the velocity error by 253 in FIG. 7b, and the gravity error is shown by the curve 255 in FIG. 7c. It is seen that the error in the surface measurements dominates the total error at small window sizes. At large sizes the acceleration error can be seen have an effect because it increases as the window size to the 3/2 power rather than decreasing like the surface-depth contribution.

In one embodiment of the invention, a weighting is used with respect to eqn. (24). The result is an equation of the form:

$$\sigma^2 = (Qx - \delta z)^T W(Qx - \delta z) \quad (34)$$
$$= (x^T Q^T - \delta z^T) W(Qx - \delta z) x^T Q^T W Q x -$$
$$x^T Q^T W \delta z - \delta z^T W Q x + \delta z^T W \delta z$$

where W is a square weighting matrix with the weights on the diagonal and zero elsewhere. Taking the derivative we solve for x and find $$x = (Q^T W Q)^{-1} Q^T W \delta z \quad (35).$$

All the matrices can be precomputed as in the unweighted method, so there is no penalty processing speed by using a weighting matrix.

The error analysis when a weighted matrix is used proceeds in a manner similar to the case without the weighting matrix and gives a result analogous to eqn. (33):

$$\sigma_{x_i}^2 = \sum_j ((Q^T W Q)^{-1} Q^T W)_{ij}^2 \left( \sigma_{x_{wt,j}}^2 + \frac{1}{3} \tau |t_j^3| \sigma_a^2 \right). \quad (36)$$

In one embodiment of the invention, the weighting matrix is based on the instrument uncertainties and is given by:

$$W_{ii} \propto \left( \sigma_x^2 + \frac{1}{3} \tau |t_j^3| \sigma_a^2 \right)^{-1} \quad (37)$$

Figure 8:
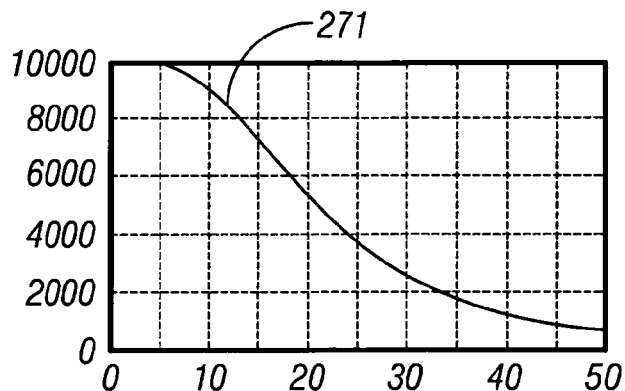
FIG. 8 shows an example of weights as a function of time within a window.

This weighting function is shown in FIG. 8 as a function of the window length.

Eqn. (19) serves as the basis for the least-square method. In essence, the method is fitting a second order polynomial in time to the difference in the depth and the integrated accelerometer data, δz. For this to be applicable, the method assumes that the inertial component of the accelerometer data is constant over the time interval used in the method. In another embodiment of the invention, this assumption is modified using a polynomial fit. Using a first order polynomial requires that an estimate of the gravitational component be made prior to the fitting process. This might be done if other information about the data were available. This information could come from the remaining two accelerometers in the three axis system. Using a third order polynomial yields information about the changing slope as it goes through a curved portion of the well. Polynomials that are fourth order and above contain coefficients that are not physical, but would help with problems such as a step change in the inertial component as the tool falls into a washout in a deviated well.

Before proceeding to a flow chart summarizing the incremental least squares method of the present invention, we define the coordinate frame in which we are working. Depth is normally positive, so the z-coordinate increases with increasing depth. Thus, the tool velocity is negative when logging out of the hole. The gravitational component is positive in a vertical well. Depending on the orientation of the downhole module, the accelerometer module may have a negative output when vertical. Thus, we may need to change the sign of the acceleration as it is acquired.

Figure 8A:
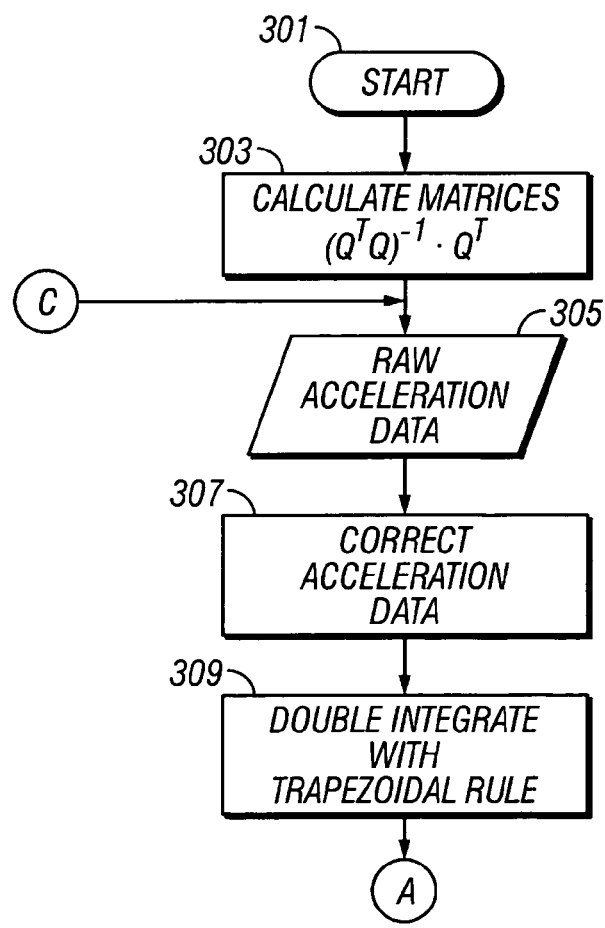
FIGS. 8a–8c illustrate steps of the method of the present invention.
Figure 8B:
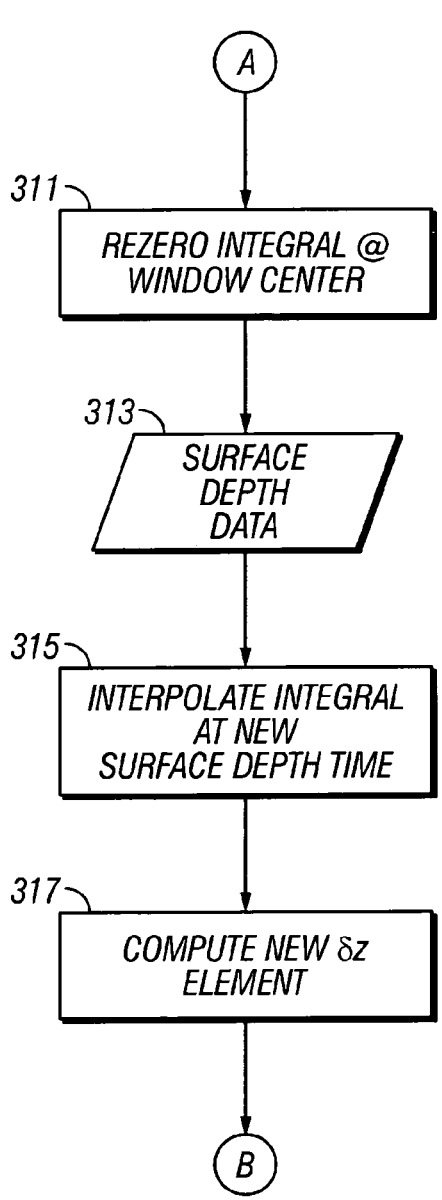
Figure 8C:
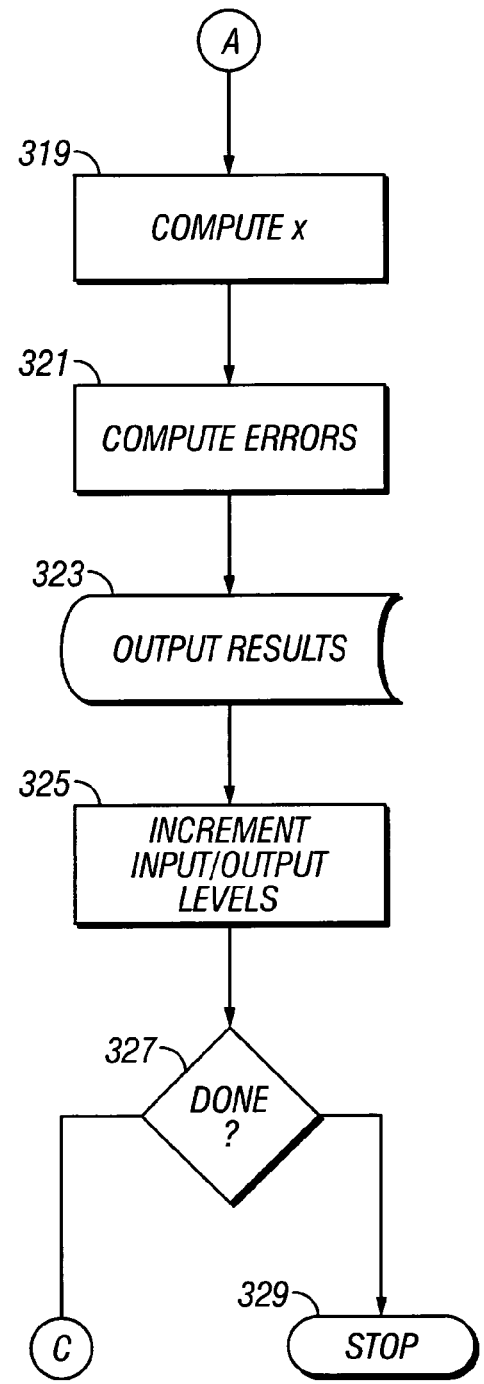

The flow diagram is shown in FIGS. 8a–8c. After the start of the process, the matrices for all window sizes up to and including the desired window size are calculated 303. Smaller window sizes are used near the ends of the data arrays. Once enough data has been added to buffers, then the desired window size is used. After obtaining new raw data 305, the data are checked for errors. There are two types of errors that should be corrected 307. If the telemetry system loses some data, the missing acceleration data is interpolated from the last good acceleration data to the next available data. On some runs, this can be as much as several seconds of data. The error correction algorithm currently corrects for this error. If the telemetry system duplicates some data, this block of data should be deleted from the buffers and the next block obtained. The missing data can then be interpolated and the computation can continue.

Next, the accelerometer data are double integrated 309. The trapezoidal rule may be used for the purpose. The data are adjusted to set the value of the integral at the center of the window to zero 311. The zeroing is necessary because the integration uses the previous integration as the integration constants and when the window is moved to a new location in the data, the integrals must be zero at the new window center. After surface depth data is acquired 313, we need to interpolate the integrals at the surface depth time 315. This is a requirement because the data acquisition interrupts are sent to the tool at irregular intervals even though the interrupts for the surface equipment may be generated at regular time intervals. Next, the vector, δz, is computed 317. Results such as x are calculated 319, as are the errors 321. The results are then output 323. The input and output data levels are incremented 325. A check is made to see if any additional data are to be processed 329. If not, the process is terminated 329. If additional data are to be acquired, the process goes back to 305.

It should be noted that the smoothing used in the present invention requires use of raw acceleration and wireline depth measurements over a time interval that is later than the time at which the depth is being estimated. A suitable memory device (not shown) on a downhole processor, surface processor or a remote processor may be used for the purpose.

We next proceed to some examples showing the utility of the present invention. There are two ways to test the method: on synthetic data or on field data. The use of a synthetic data set to test the algorithm is problematic. For arbitrary acceleration curves, the tool depths can not be calculated with sufficient accuracy. Thus, we are left with using acceleration curves that are analytic in nature, i.e., depths and accelerations are calculated analytically and the comparison made to computed results.

The test data set is comprised of a sine wave given by $$z = v_0 t + A \sin(2\pi f t)$$

Figure 9:
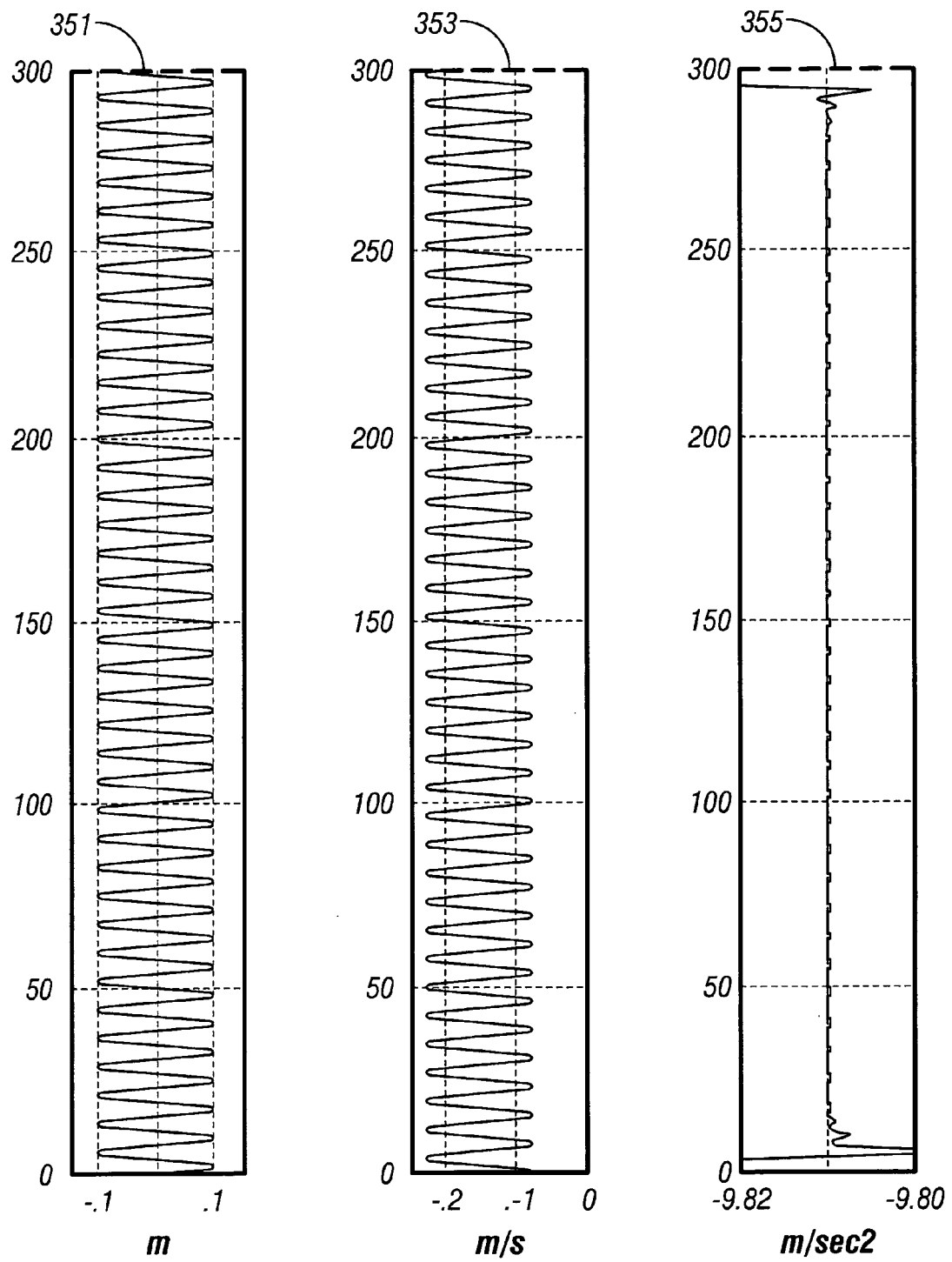
FIG. 9 shows a comparison of results obtained with the method of the present invention with an analytic solution for synthetic data.
Figure 10:
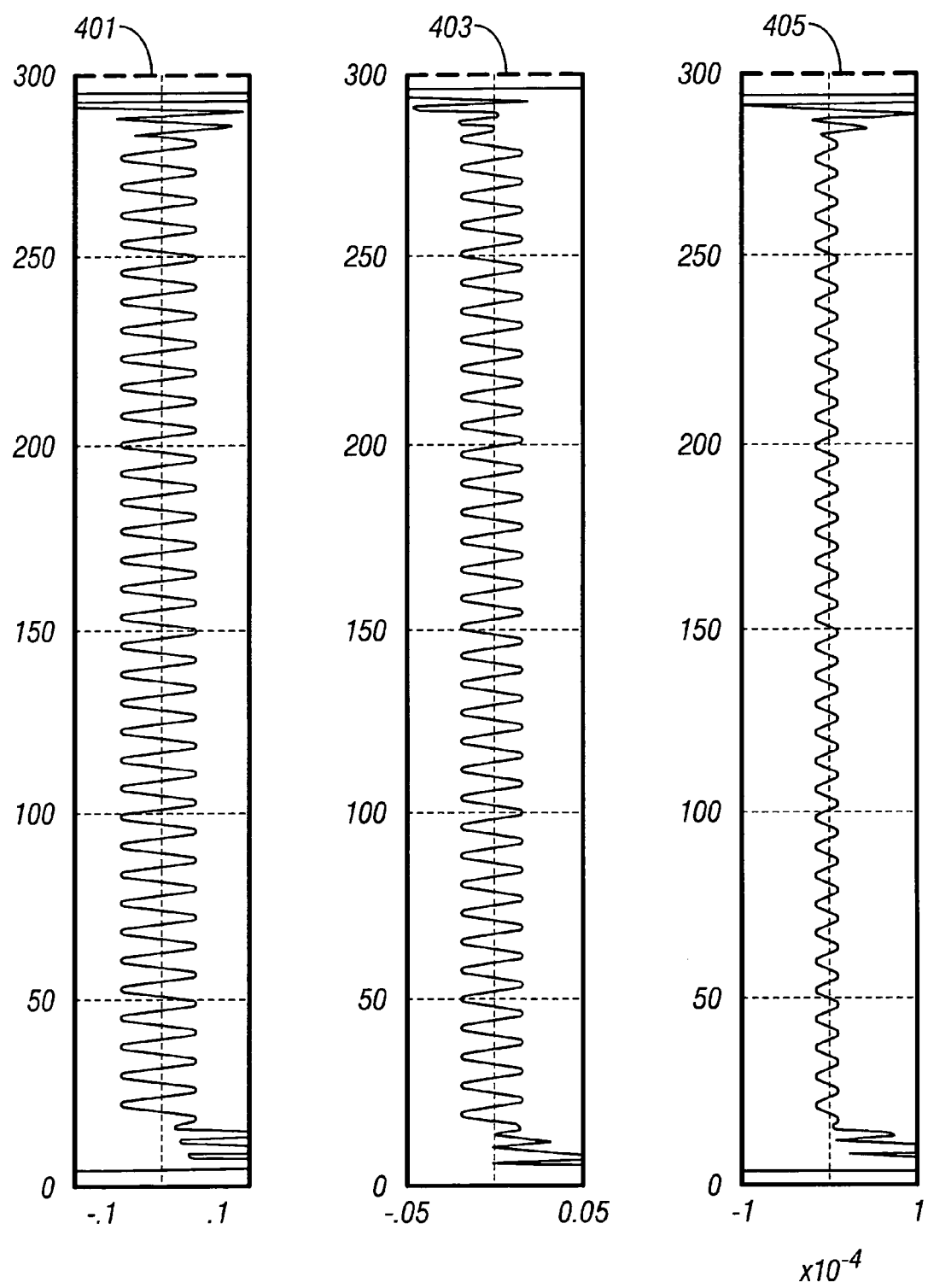
FIG. 10 shows the fractional deviation of results obtained with the method of the present invention from an analytic solution for synthetic data.

In this set f=0.129 Hz, A=0.1 m, and $v_0$=−0.15 m/s. The vertical gravitational constant is set at 9.81 m/s². The accelerometer dwell time is 0.04 s. The surface depth time interval is 1.0 s. FIG. 9 shows computed depths 351, velocity 353, and gravitational components 355 for an analytic test data set. This figure shows good agreement between the computed and analytic result except at the ends of the data set. The disagreement at the ends stems from the use of a window width that is smaller than used elsewhere. The use of a smaller width is required because there is not enough data near the ends. Alternatively, one could simply duplicate the surface depth until enough data existed. FIG. 10 shows the errors associated with the least-square method in this data set. The fractional deviation of the depth measurement 401 from the analytic results is less than 5%. The fractional deviation for the velocity measurement is about 2.5%. Finally, the error on the gravitational component is less than 100 ppm from the analytic result. Not shown are computed errors from the equations given above.

Figure 11:
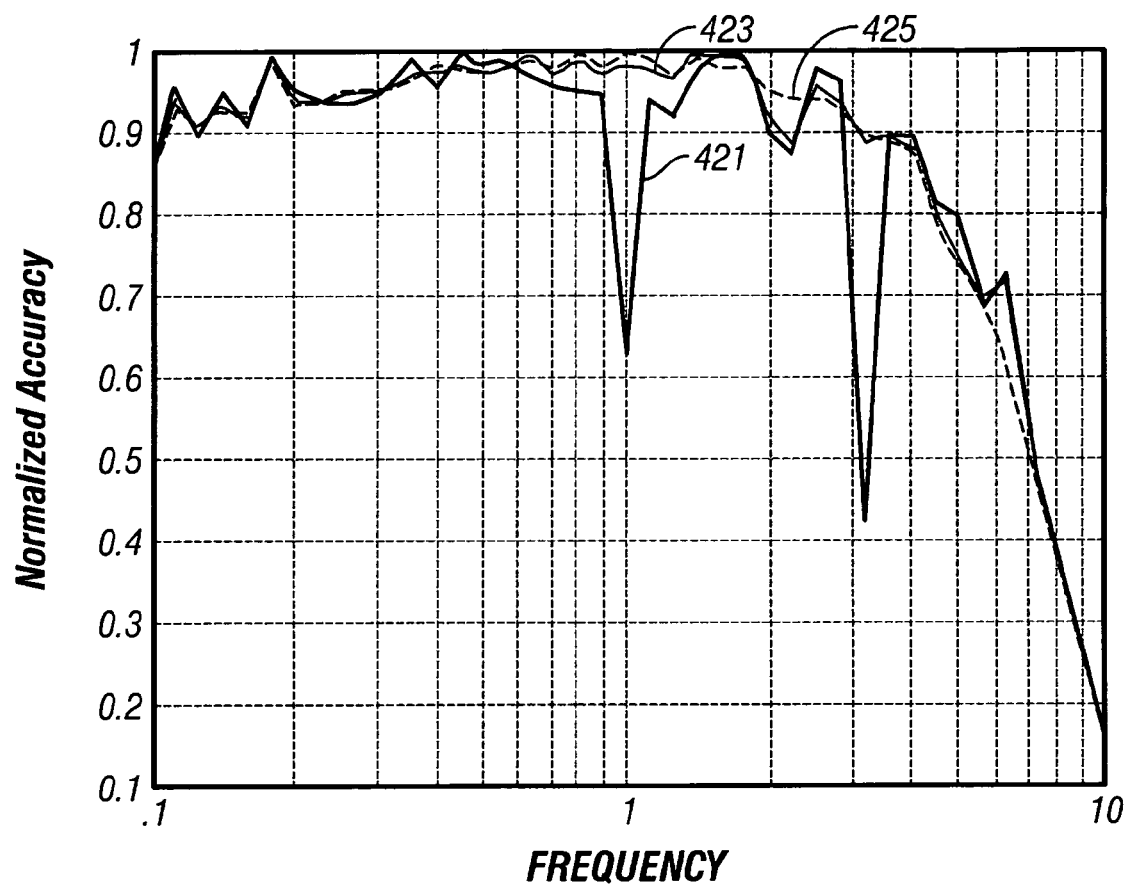
FIG. 11 shows the frequency response of the method of the present invention.

FIG. 11 shows the frequency response of the least-square algorithm as a function of the depth time-interval. The time intervals are 0.24, 0.48 and 0.96 seconds given by the curves 421, 423 and 425 respectively. These were chosen to make the depth time-intervals even multiples of the dwell time for the acceleration data. The first thing to note is that there is a marked decrease in the accuracy at multiples of $1/\tau_z$, where $\tau_z$ is the depth time-interval. The cause of this decrease is that the double integral of the sine wave acceleration is identically zero. Thus, there is no deviation from the estimated depth. The second feature to note is that there is a general decrease in the accuracy as a function of frequency. This is caused by the fact that accelerations at frequencies larger than $1/\tau_z$ will be aliased to lower frequencies. Because they have been integrated with a dwell time of 0.04, the amplitude will be smaller by $1/f^2$. Finally, the accuracy decreases gradually as f approaches zero. This is caused by the size of the sampling window. At small frequencies, the window is too small to sample enough of the acceleration curve to establish an accurate gravitational component.

Figure 12:
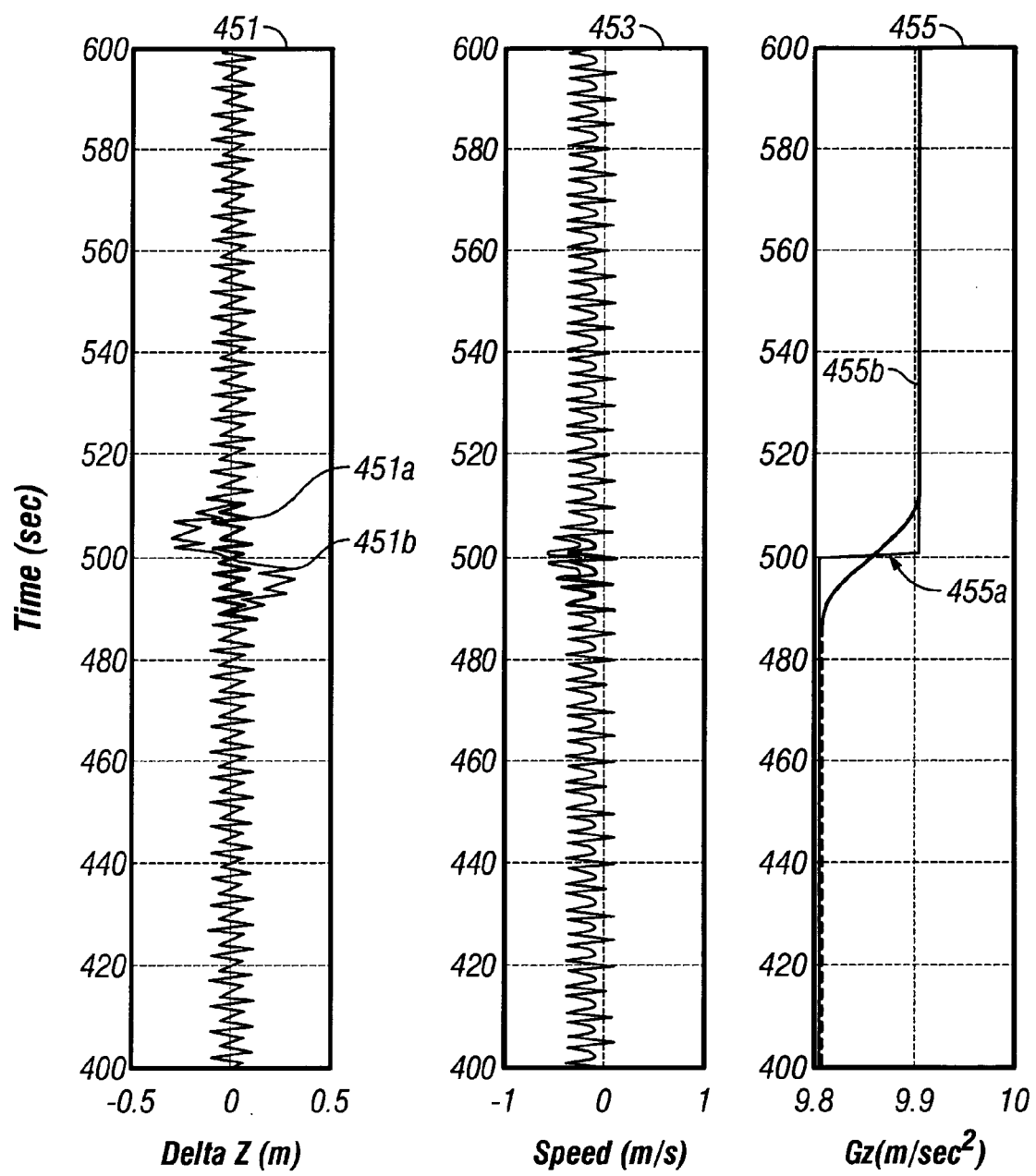
FIG. 12 shows the response of the least-square algorithm to a 1% step change in the gravitational component of the acceleration.

A log run at a test facility displayed an anomalous low-frequency component to the depth corrections. This particular log was in a deviated well with large washouts. One explanation for the anomalous component is that the tool tilted into one of the washouts, thereby creating a rapidly changing inertial component. If true, one of the assumptions required of the least-square method is violated. To test the proposed explanation, a synthetic data set was constructed with a 1% step change in the inertial component. The accelerometer data was synthesized from a 0.4 Hz sine wave oscillation with amplitude that produces a 0.1 m amplitude deviation from the surface depth measurement. The surface depth is given by a constant wireline speed of −0.15 m/s. The results of processing the data set are shown in FIG. 12. The step change is at t=500. The gravitational component to the acceleration varies smoothly from 490 to 510. This corresponds approximately to the half-width of the processing window. Over this same time interval the tool velocity shows a small decrease from the actual values. Finally, the LS depth correction deviates from the actual depth correction in the same manner as the logging run from the Mounds test facility. While not conclusive, this observation supports the explanation that tool tilting can cause misbehavior in LS algorithm. As before, the left panel 451 is the depth, the center panel 453 is the velocity and the right panel 455 is the gravity component. 451b and 455b are the actual values and 451a and 455a are the estimated values.

Figure 13:
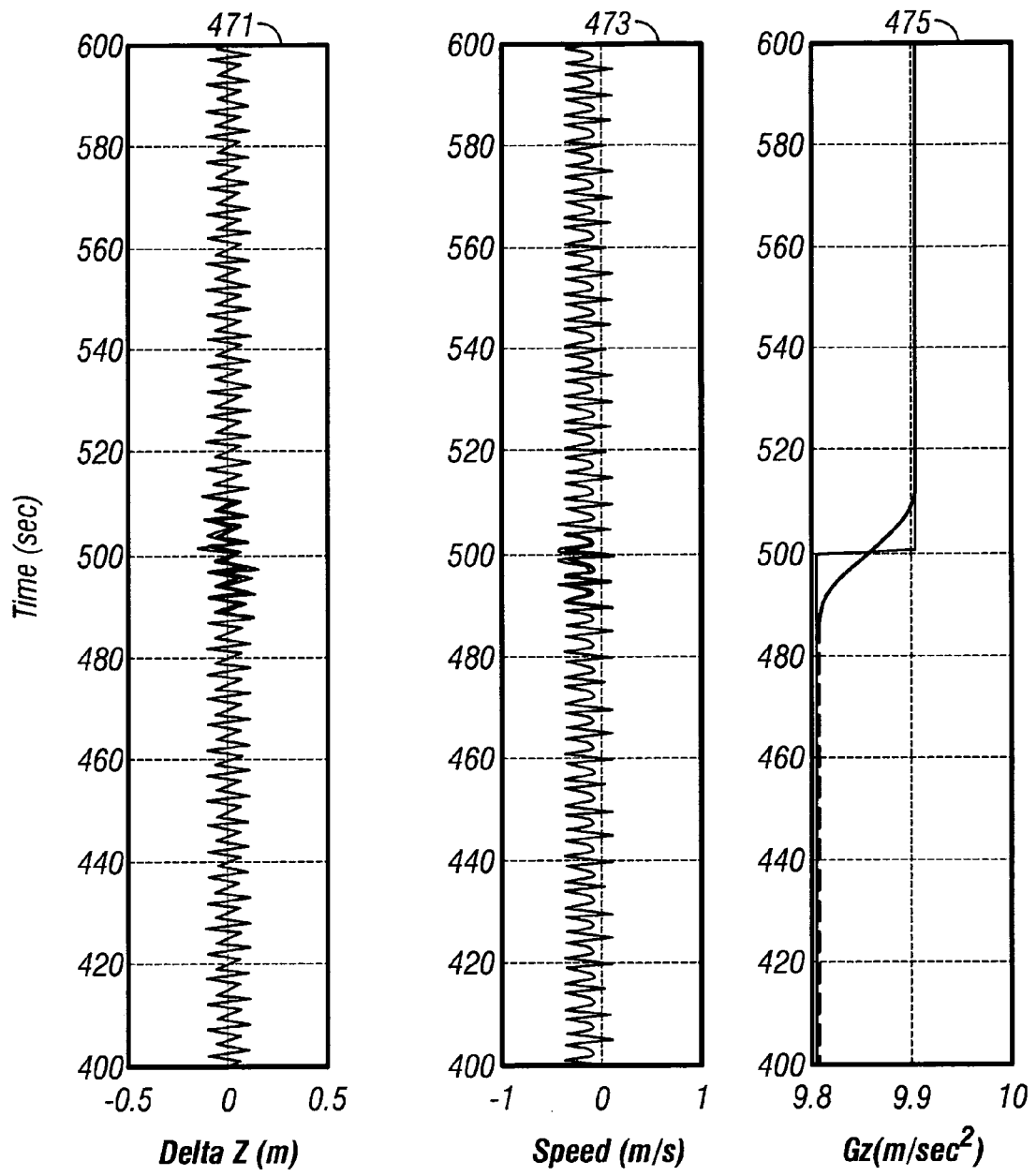
FIG. 13 shows the response of a weighted least square algorithm to a 1% step change in gravitational component of acceleration.

FIG. 13 shows that the effect of the step function can be reduced by using a depth weighting factor that is used to derive LS results that are consistent with Kalman filter results in test logs. The weighting factor was 0.001 m. As before, the left panel 471 is the depth, the center panel 473 is the velocity and the right panel 475 is the gravity component. It effectively narrows the window from a width of 30 seconds to a width closer to 15 seconds. There is a considerable reduction in the depth error.

Additional simulation results (not shown) indicate that higher order fits to the accelerometer and depth data show an increase in precision over the second order fit in the region of a step change in inertial component, but at the expense of a slight decrease in precision in regions where the inertial component is constant. The third order coefficient is the rate at which the acceleration's inertial component is changing. However, the fourth and higher order coefficients have no physical meaning. Nevertheless, it may be prudent to include up to fifth order terms in deviated wells with washouts.

Those skilled in the art will devise other embodiments of this invention which do not depart from the spirit of the invention as disclosed herein. Accordingly, the invention should be limited in scope only by the attached claims.

What is claimed is:

1. A method of estimating the depth at a selected time of an instrument conveyed in a borehole penetrating an earth formation comprising:
    (a) obtaining first measurements of the depth of the instrument, said first measurements being made over a time interval subsuming said selected time;
    (b) making measurements of tool motion along the borehole axis over said time interval;
    (c) estimating the depth of the instrument from said first measurements and said motion measurements made over said time interval; and
    (d) outputting the estimated depth of the instrument to a suitable medium,
    wherein said first measurements are independent of said motion measurements.

2. The method of claim 1 wherein said instrument is conveyed on a cable and obtaining said first measurements comprises making measurements of a length of said cable.

3. The method of claim 1 wherein said estimating said depth further comprises performing integration of said motion measurements to determine distance.

4. The method of claim 1 wherein said specified time is substantially at a center of said time interval.

5. The method of claim 1 wherein over said time interval, an inclination of said borehole is substantially constant.

6. The method of claim 1 wherein said motion measurements are sampled with a sampling interval $\tau$, the method further comprising selecting said sampling interval based on a specified depth error and a specified acceleration of said logging instrument.

7. The method of claim 1 further comprising selecting a length of said time interval based on at least one of (i) a specified logging speed, (ii) an inclination of said borehole, and (iii) a build rate of said borehole.

8. The method of claim 1 wherein said estimation of said depth of said instrument is obtained by using a relation of the form:

$$x = (Q^T Q)^{-1} Q^T \delta z$$

wherein x is a vector denoting said estimate of said depth, $\delta z$ is a vector denoting a difference between said surface depth measurements and depth measurements obtained by integration of said motion measurements, and Q is a matrix defined by sampled times within said time interval.

9. The method of claim 7 wherein said time interval is symmetric with respect to said specified time, and Q is given by an equation of the form:

$$Q = \begin{bmatrix} 1 & t_{-M} & \frac{1}{2}t^2_{-M} \\ 1 & t_{-M+1} & \frac{1}{2}t^2_{-M+1} \\ \vdots & \vdots & \vdots \\ \vdots & \vdots & \vdots \\ 1 & t_M & \frac{1}{2}t^2_M \end{bmatrix}$$

wherein the t's are times within said time interval.

10. The method of claim 9 wherein said matrix is precomputed.

11. The method of claim 1 further comprising estimating an error in said depth, and an error in determining a velocity of said instrument.

12. The method of claim 1 wherein said estimation of said depth of said instrument is obtained by using a relation of the form:

$$x = (Q^T W Q)^{-1} Q^{-1} Q^T W \delta z$$

wherein x is a vector denoting said estimate of said depth, δz is a vector denoting a difference between said surface depth measurements and depth measurements obtained by integration of said motion measurements, Q is a matrix defined by sampled times within said time interval, and W is a weighting matrix.

13. The method of claim 12 wherein said time interval is symmetric with respect to said specified time, and Q is given by an equation of the form:

$$Q = \begin{bmatrix} 1 & t_{-M} & \frac{1}{2}t^2_{-M} \\ 1 & t_{-M+1} & \frac{1}{2}t^2_{-M+1} \\ \vdots & \vdots & \vdots \\ \vdots & \vdots & \vdots \\ 1 & t_M & \frac{1}{2}t^2_M \end{bmatrix}$$

wherein the t's are times within said time interval.

14. The method of claim 1 wherein in said depth estimation, an inertial component of said motion measurements is selected from the group consisting of (i) a constant, (ii) a first order polynomial, (iii) a second order polynomial, (iii) a third order polynomial, and, (iv) a fourth order polynomial.

15. The method of claim 1 wherein, within said time interval, said logging instrument passes through a washed out portion of said borehole, the method further comprising using a first or higher order polynomial to an inertial component of said motion measurements.

16. An apparatus for estimating the depth at a selected time of an instrument conveyed in a borehole penetrating an earth formation comprising;
    (a) a first device which makes first measurements indicative of the depth of the instrument, said first measurements being made over a time interval subsuming said selected time;
    (b) a motion sensor which obtains measurements of the axial motion of the tool along the borehole axis ova said time interval; and
    (c) a processor which estimates said depth of the instrument from said first measurements and said motion measurements and outputs the estimate depth of the instrument to a suitable medium;
    wherein said first measurements are substantially independent of said motion measurements.

17. The apparatus of claim 16 wherein said instrument is conveyed on a cable and said first device comprises a device which makes measurements of a length of said cable that is one of (i) spooled, and, (ii) unspooled from a surface wheel.

18. The apparatus of claim 16 wherein said processor further performs an integration of said motion measurements.

19. The apparatus of claim 16 wherein said specified time is substantially at a center of said time interval.

20. The apparatus of claim 16 wherein over said time interval, an inclination of said borehole is substantially constant.

21. The apparatus of claim 16 further comprising an analog to digital (A/D) converter that samples said motion sensor measurements with a sampling interval τ, and wherein said processor further selects said sampling interval based on a specified depth error and a specified motion of said logging instrument.

22. The apparatus of claim 16 wherein said processor further selects a length of said time interval based on at least one of (i) a specified logging speed, (ii) an inclination of said borehole, and, (iii) a build rate of said borehole.

23. The apparatus of claim 16 wherein said processor further estimates said depth of said instrument by using a relation of the form:

$$x = (Q^T Q)^{-1} Q^T \delta z$$

wherein x is a vector denoting said estimate of said depth, δz is a vector denoting a difference between said surface depth measurements and depth measurements obtained by integration of said motion measurements, and Q is a matrix defined by sampled times within said time interval.

24. The apparatus of claim 23 wherein said time interval is symmetric with respect to said specified time, and Q is given by an equation of the form:

$$Q = \begin{bmatrix} 1 & t_{-M} & \frac{1}{2}t^2_{-M} \\ 1 & t_{-M+1} & \frac{1}{2}t^2_{-M+1} \\ \vdots & \vdots & \vdots \\ \vdots & \vdots & \vdots \\ 1 & t_M & \frac{1}{2}t^2_M \end{bmatrix}$$

wherein the t's are times within said time interval.

25. The apparatus of claim 24 wherein said processor precomputes said matrix.

26. The apparatus of claim 16 wherein said processor further estimates an error in said depth and an error in determining a velocity of said instrument.

27. The apparatus of claim 16 wherein said processor further estimates said depth of said instrument by using a relation of the form:

$$x = (Q^T W Q)^{-1} Q^T W \delta z$$

wherein x is a vector denoting said estimate of said depth, δz is a vector denoting a difference between said surface depth measurements and depth measurements obtained by integration of said motion measurements, Q is a matrix defined by sampled times within said time interval, and W is a weighting matrix.

28. The apparatus of claim 27 wherein said time interval is symmetric with respect to said specified time, and Q is given by an equation of the form:

$$Q = \begin{bmatrix} 1 & t_{-M} & \frac{1}{2}t^2_{-M} \\ 1 & t_{-M+1} & \frac{1}{2}t^2_{-M+1} \\ \vdots & \vdots & \vdots \\ \vdots & \vdots & \vdots \\ 1 & t_M & \frac{1}{2}t^2_M \end{bmatrix}$$

wherein the t's are times within said time interval.

29. The apparatus of claim 16 wherein in said depth estimation, said processor further selects an inertial component of said motion measurements from the group consisting of (i) a constant, (ii) a first order polynomial, (iii) a second order polynomial, (iii) a third order polynomial, and, (iv) a fourth order polynomial.

30. The apparatus of claim 16 wherein, within said time interval, said logging instrument passes through a washed out portion of said borehole, and in said depth determination, the processor further uses a first or higher order polynomial for defining an inertial component of said motion measurements.

31. The apparatus of claim 16 further comprising a memory device for storing said accelerometer measurements and said first depth measurements.

32. The method of claim 1 wherein the motion measurements compriseacceleration measurements.

33. The apparatus of claim 16 wherein the motion sensor comprises an accelerometer.

34. A method of estimating the depth at a selected time of an instrument conveyed in a borehole penetrating an earth formation comprising:
   (a) making surface measurements of the depth of the instrument, said surface measurements being made over a time interval subsuming said selected time;
   (b) making measurements of tool motion along the borehole axis over said time interval;
   (c) estimating the depth of the instrument from said surface measurements and said motion measurements made over said time interval; and
   (d) outputting the estimated depth of the instrument to a suitable medium;
   wherein said first measurements are independent of said motion measurements.

* * * * *